(12) United States Patent
Lo et al.

(10) Patent No.: US 11,856,227 B2
(45) Date of Patent: Dec. 26, 2023

(54) TRANSFORM ARCHITECTURE IN VIDEO ENCODING SYSTEMS

(71) Applicant: MEDIATEK INC., Hsinchu (TW)

(72) Inventors: Chih-Hsuan Lo, Hsinchu (TW);
Man-Shu Chiang, Hsinchu (TW);
Chun-Chia Chen, Hsinchu (TW);
Chih-Wei Hsu, Hsinchu (TW);
Tzu-Der Chuang, Hsinchu (TW);
Ching-Yeh Chen, Hsinchu (TW);
Yu-Wen Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/825,269

(22) Filed: May 26, 2022

(65) Prior Publication Data

US 2023/0388546 A1    Nov. 30, 2023

(51) Int. Cl.
*H04N 19/625*      (2014.01)
*H04N 19/124*      (2014.01)
(Continued)

(52) U.S. Cl.
CPC ......... *H04N 19/625* (2014.11); *H04N 19/122* (2014.11); *H04N 19/124* (2014.11);
(Continued)

(58) Field of Classification Search
CPC .. H04N 19/625; H04N 19/122; H04N 19/124; H04N 19/176; H04N 19/18; H04N 19/423; H04N 19/132; H04N 19/105
See application file for complete search history.

(56) References Cited

U.S. PATENT DOCUMENTS 8,666,166 B2    3/2014    Bulusu et al.
11,582,451 B2    2/2023    Xu et al.
(Continued)

FOREIGN PATENT DOCUMENTS

CN    111836050 A    10/2020
CN    114365490 A    4/2022
(Continued)

OTHER PUBLICATIONS

Yang Guo; "Accelerating Transform Algorithm Implementation for Efficient Intra Coding of 8K UHD Videos", Peking University, Feb. 2022 (Year: 2022).*
(Continued)

*Primary Examiner* — Dramos Kalapodas
(74) *Attorney, Agent, or Firm* — McClure, Qualey & Rodack, LLP

(57) ABSTRACT

Video encoding methods and apparatuses in a video encoding system receive an input residual signal of a current block by a shared transform circuit, apply horizontal transform and vertical transform by a shared transform circuit to generate transform coefficients, apply quantization and inverse quantization to generate recovered transform coefficients, apply inverse vertical transform and inverse horizontal transform to the recovered transform coefficients by the shared transform circuit to generate a reconstructed residual signal for the current block, and encode the current block based on quantized levels of the current block. The shared transform circuit and a coefficient buffer in the folded 4-time transform architecture reuse computation resources in each transform stage. In some embodiments of the folded 4-time transform architecture, a hierarchical design for block size grouping is implemented with fixed throughput for uniform hardware scheduling.

14 Claims, 8 Drawing Sheets

(51) Int. Cl.
　　　*H04N 19/122*　　(2014.01)
　　　*H04N 19/18*　　　(2014.01)
　　　*H04N 19/176*　　(2014.01)
　　　*H04N 19/423*　　(2014.01)

(52) U.S. Cl.
　　　CPC .......... *H04N 19/176* (2014.11); *H04N 19/18* (2014.11); *H04N 19/423* (2014.11)

(56) References Cited

U.S. PATENT DOCUMENTS

| | | | |
|---|---|---|---|
| 2018/0199037 A1* | 7/2018 | Philippe | H04N 19/61 |
| 2019/0208203 A1* | 7/2019 | Tsukuba | H04N 19/46 |
| 2020/0280740 A1* | 9/2020 | Tsukuba | H04N 19/70 |
| 2021/0014533 A1* | 1/2021 | Tsukuba | H04N 19/426 |
| 2021/0021870 A1* | 1/2021 | Tsukuba | H04N 19/46 |
| 2021/0144376 A1* | 5/2021 | Tsukuba | H04N 19/139 |
| 2021/0185357 A1* | 6/2021 | Tsukuba | H04N 19/61 |
| 2022/0014741 A1* | 1/2022 | Xiu | H04N 19/159 |

FOREIGN PATENT DOCUMENTS

| | | | | |
|---|---|---|---|---|
| EP | 3952313 A1 * | 2/2022 | .......... | H04N 19/122 |
| TW | 200820787 A | 5/2008 | | |
| WO | 2021/238828 A1 | 12/2021 | | |

OTHER PUBLICATIONS

Chinese language office action dated Mar. 21, 2023, issued in application No. TW 111125327.

\* cited by examiner

Fig. 2B                    Fig. 2C

TRANSFORM ARCHITECTURE IN VIDEO ENCODING SYSTEMS

FIELD OF THE INVENTION

The present invention relates to a transform architecture in video encoding systems. In particular, the present invention relates to a shared transform module for transform and inverse transform operations in video encoding.

BACKGROUND AND RELATED ART

The Versatile Video Coding (VVC) standard is the latest video coding standard developed by the Joint Collaborative Team on Video Coding (JCT-VC) group of video coding experts from ITU-T Study Group. The VVC standard inherited the former High Efficiency Video Coding (HEVC) standard which relies on a block-based coding structure, where each video picture contains one or a collection of slices and each slice is divided into an integer number of Coding Tree Units (CTUs). The individual CTUs in a slice are processed according to a raster scanning order. Each CTU is further recursively divided into one or more Coding Units (CUs) to adapt to various local motion and texture characteristics. The prediction decision is made at the CU level, where each CU is encoded according to one or more best coding mode selected according to a Rate Distortion Optimization (RDO) technique. The video encoder exhaustively tries multiple mode combinations to select one or more best coding mode for each CU in terms of maximizing the coding quality and minimizing bit rates. A specified prediction process is employed to predict the values of associated pixel samples inside each CU. A residual signal is a difference between the original pixel samples and predicted values of the CU. After obtaining the residual signal generated by the prediction stage, residual data of the residual signal belong to a Transform Unit (TU) is then transformed into transform coefficients for compact data representation. These transform coefficients are quantized and conveyed to the decoder. The terms Coding Tree Block (CTB), Coding block (CB) and Transform Block (TB) are defined to specify two-dimensional sample array of one color component associated with the CTU, CU, and TU respectively. For example, a CTU consists of one luminance (luma, Y) CTB, two chrominance (chroma, Cb and Cr) CTBs, and its associated syntax elements.

Several transform design aspects adopted in the VVC standard inherit from the transform design in the HEVC standard, such as the use of fixed-point operations, 16-bit intermediate data representation and arithmetic, and the transform process is implemented using direct matrix multiply or partial butterfly. The VVC standard has a better flexibility as it not only allows square transform block sizes but also rectangular block sizes. In addition to the conventional type-2 Discrete Cosine Transform (DCT-II), Multiple Transform Selection (MTS) employs type-7 Discrete Sine Transform (DST-VII) and type-8 DCT (DCT-VIII) in the VVC standard. For uneven distribution of residual, DST-VII and DCT-VIII are usually more efficient than DCT-II. The transform size of DCT-II ranges from 4-point to 64-point while the transform size of DST-VII and DCT-VIII range from 4-point to 32-point. An N-point transform refers to a one-dimensional transform that can be applied on an N-point input vector, which is done using a transform matrix of size N by N. The transform kernels defined in the VVC standard are composed of 8-bit signed integers and all the primary transform kernels in the HEVC standard, including 4-point DST-VII and DCT-II ranging from 4-point to 32-point, are kept unchanged. To align the worst-case multiplications per coefficient with the HEVC standard, for 64-point DCT-II and 32-point DST-VII or DCT-VIII, only the first 32 and 16 low-frequency coefficients are kept, respectively, while the high frequency coefficients are zeroed out, which is also considered in last coefficient position coding and coefficient group scanning.

In the VVC standard, there are two variants of MTS, explicit and implicit MTS. The explicit MTS is applied to both intra and inter coded blocks, while the implicit MTS is only used for intra coded blocks. The choice of DST-VII or DCT-VIII is indicated by explicit signaling of the transform type in explicit MTS, whereas the transform type is selected based on coding information that is known to both the encoder and decoder in implicit MTS.

The distribution of inter-predicted residual is different from that of intra-predicted residual. Statistically, energy of -intra predicted residual increases from the center of prediction block towards its boundaries. In many inter prediction blocks, inter-predicted residuals are localized at one side of the block, rather than being distributed around all block boundaries. A Sub-Block Transform (SBT) coding tool was developed in VVC to capture the localized residuals by smaller transform blocks and consider the unique distribution of inter-predicted residual. There are eight SBT modes associated with different configurations of the size and location of transform blocks in the VVC standard. The transform block is either half or quarter size of the residual block when SBT is used, where residual in the remaining part of the residual block is not coded and regarded as zero. In SBT, the transform blocks always reside in one boundary of the residual block. The transform kernel used for transforming transform coefficients is adaptively selected according to the transform block position when SBT is used. The residual energy typically increases from one side to the other when the residual is not evenly distributed within the residual block. For instance, if the transform block at the left side of the residual block is selected to be the best mode, the right side contains weaker residual. In this case, DCT-VIII is more efficient than DCT-II for the horizontal transform since the basis vector decreases from left to right. For the other dimension of the transform block, DST-VII is selected based on experimental results.

FIG. 1 shows an intuitive transform architecture implementation taking a 64*64 TB as an example. A Horizontal Transform (HT) module 102 receives an input residual TB to generate horizontal transform coefficients, and the horizontal transform coefficients are stored in a first coefficient buffer 104. The size of the input residual TB is 64*64, so the first 32 columns of low-frequency coefficients are kept in the coefficient buffer 104 while the 32 columns of high frequency coefficients are zeroed out according to the VVC standard. The horizontal transform coefficients are transposed and stored in a second coefficient buffer 106 to be processed by a Vertical Transform (VT) module 108. The output of the vertical transform module 108 is further processed by a Quantization (RDOQ) module 110 followed by an Inverse Quantization (IQ) module 112. The output of the inverse quantization module 112 is stored in a third coefficient buffer 114 to be inverse vertical transformed by an Inverse Vertical Transform (ITV) module 116. The output of the inverse vertical transform module 116 is stored in a fourth coefficient buffer 118 and then a fifth coefficient buffer 120 after transposing. An Inverse Horizontal Transform (IHT) module 122 applies inverse horizontal transform to generate an output residual TB. Four distinct one-dimensional transform modules are employed for the four transform stages as shown in FIG. 1. Although this intuitive transform architecture can support sequential input of different sizes of residual TBs and each transform module can be manipulated easily, this architecture is not very cost effective as these four independent one-dimensional transform modules perform regular and repeated computation pattern of transform.

BRIEF SUMMARY OF THE INVENTION

In various embodiments of a video encoding method according to the present invention, a video encoding system receives input residual signal associated with a current block in a current video picture by a shared transform circuit, applies horizontal transform to the input residual signal by the shared transform circuit to generate horizontal transform coefficients, applies vertical transform to the horizontal transform coefficients by the shared transform circuit to generate transform coefficients for the current block, applies quantization to the transform coefficients to generate quantized levels then applies inverse quantization to generate recovered transform coefficients, applies inverse vertical transform to the recovered transform coefficients by the shared transform circuit to generate inverse vertical transform coefficients, applies inverse horizontal transform to the inverse vertical transform coefficients by the shared transform circuit to generate a reconstructed residual signal for the current block, and encodes the current block based on the quantized levels of the current block. In some embodiments of the video encoding system, a coefficient buffer is used to store intermediate transform coefficients. The video encoding method further comprises storing the horizontal transform coefficients in the coefficient buffer and reading the horizontal transform coefficients from the coefficient buffer by the shared transform circuit for vertical transform, storing recovered transform coefficients in the coefficient buffer and reading the recovered transform coefficients from the coefficient buffer by the shared transform circuit for inverse vertical transform, and storing the inverse vertical transform coefficients in the coefficient buffer and reading the inverse vertical transform coefficients from the coefficient buffer by the shared transform circuit for inverse horizontal transform. The shared transform circuit comprises a controller reading the horizontal transform coefficients from the coefficient buffer in a transpose manner to obtain a transposed matrix for vertical transform. The controller also reads the recovered transform coefficients from the transform buffer in the transpose manner to obtain another transposed matrix for inverse vertical transform. An embodiment of the coefficient buffer comprises a transpose memory for reducing the number of multiplexers in the shared transform circuit. An embodiment of the transpose memory is a shift register cluster which shifts a row in the coefficient buffer in each cycle for horizontal transform or inverse horizontal transform, and shifts a column in the coefficient buffer in each cycle for vertical transform or inverse vertical transform. In an embodiment, a number of 16-bit registers in the shift register cluster is equal to half of a block width multiplied by a block height when any of the block width and block height of the current block is equal to 64 samples, and a number of 16-bit registers in the shift register cluster is equal to a block width multiplied by a block height when both the block width and block height of the current block are less than 64 samples. The coefficient buffer is consisting of 32*64 16-bit registers and 32*64 sets of Multiplier Accumulate operations (MACs) are needed in the shared transform circuit when the current block is a 64*64 transform block.

In some embodiments of the present invention, the shared transform circuit implements a zero-out mechanism to reduce a computation complexity when the current block is a 64*64 transform block for DCT-II transform, or when the current block is a 32*32 transform block for DST-VII transform or DCT-VIII transform. The zero-out mechanism forces half of the horizontal transform coefficients to be zero after horizontal transform and another quarter of the transform coefficients to be zero after vertical transform. The shared transform circuit can support multiple transform schemes including DCT-II transform, DST-VII transform, and DCT-VIII transform. In some embodiments, the reconstructed residual signal is stored in a memory.

In one embodiment, the shared transform circuit is used to process blocks with one or more predetermined sizes, and the video coding system comprises a second shared transform circuit for processing blocks with sizes other than the predetermined sizes. For example, the shared transform circuit is used to process blocks with sizes 64*64, 64*32, and 32*64, and the second shared transform circuit is used to process blocks with sizes 32*32, 32*16, and 16*32. In some embodiments, the shared transform circuit is used to process blocks with a first set of predetermined sizes, and the video coding system comprises a second shared transform circuit for processing blocks with a second set of predetermined sizes. The second set of predetermined sizes is different from the first set of predetermined sizes. In a preferred embodiment, the predetermined sizes in the first set are similar to each other while the predetermined sizes in the second set are similar to each other. An embodiment of the shared transform circuit is configured to process a plurality of complementary Sub-Block Transform (SBT) modes in one transform run.

Aspects of the disclosure further provide an apparatus for the video encoding system. The apparatus comprises one or more electronic circuits configured for receiving an input residual signal of a current block by a shared transform circuit, applying horizontal transform to the input residual signal by the shared transform circuit to generate horizontal transform coefficients, applying vertical transform to the horizontal transform coefficients by the shared transform circuit to generate transform coefficients for the current block, applying quantization to the transform coefficients to generate quantized levels then applying inverse quantization to generate recovered transform coefficients, applying inverse vertical transform to the recovered transform coefficients by the shared transform circuit to generate inverse vertical transform coefficients, applying inverse horizontal transform to the inverse vertical transform coefficients by the shared transform circuit to generate a reconstructed residual signal for the current block, and encoding the current block based on the quantized levels of the current block. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, wherein like numerals reference like elements, and wherein:

FIGS. 2A-2D illustrate each of the four transform stages performed by a shared transform circuit in a folded 4-time transform architecture according to an embodiment of the present invention.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

Figure 1:
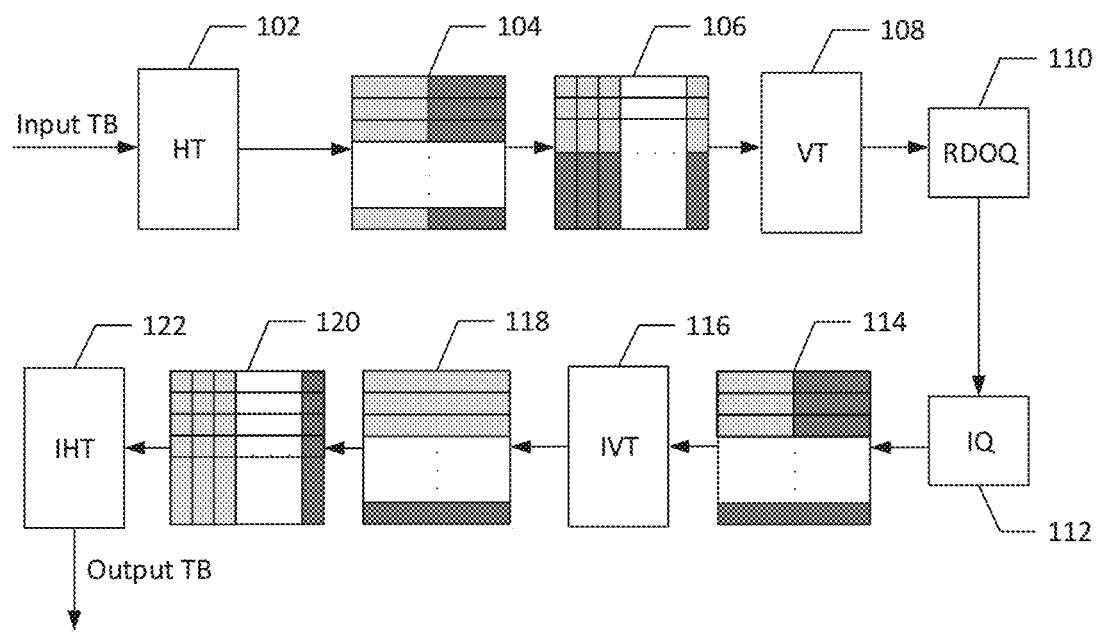
FIG. 1 illustrates an intuitive transform architecture implementation for processing a 64*64 transform block.
Figure 2A:
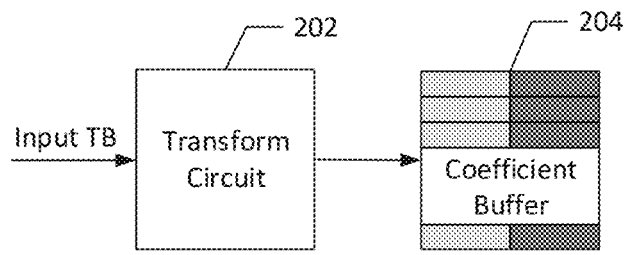
Figure 2D:
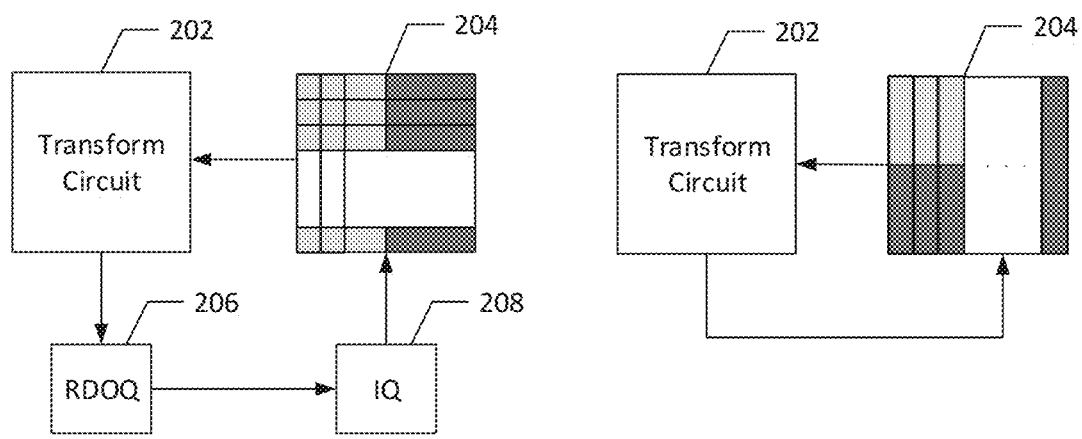
Figure 2D:
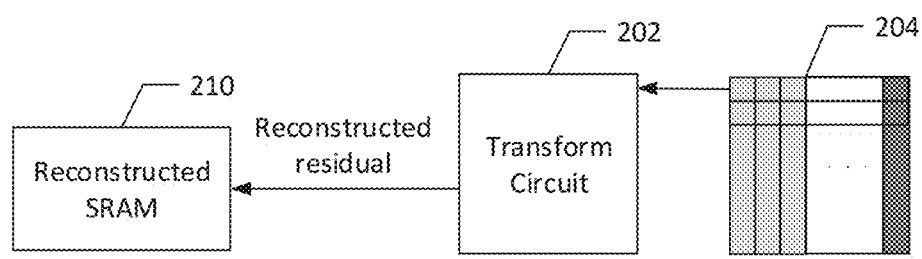

Folded 4-time Transform Architecture In a High-Complexity (HC) Rate Distortion Optimization (RDO) stage, a video encoder applies transform, quantization, inverse quantization, and inverse transform operations to input residual of a current block to calculate a rate and a distortion associated with a coding mode. The rate indicates a number of bits required for coding the current block using the coding mode, whereas the distortion is typically computed based on a difference between a reconstructed residual signal and the input residual signal of the current block. After trying multiple coding modes in the HC RDO stage, a best coding mode with a lowest Rate Distortion (RD) cost is selected for the current block. The current block is encoded based on a predictor and the quantized levels output from the quantization operation associated with the best coding mode. The transform and inverse transform operations has four transform stages including horizontal transform, vertical transform, inverse vertical transform, and inverse horizontal transform stages. FIGS. 2A-2D illustrate each of the four transform stages performed by a shared transform circuit in a folded 4-time transform architecture for a 64*64 Transform Block (TB) according to an embodiment of the present invention. To reuse computation resource of each transform stage and support DCT-II transform and non-DCT-II transforms within one transform module, a designed transform module is shared for the four transform stages. Some examples of the non-DCT-II transforms are DCT-VIII and DST-VII transforms in the MTS coding tool. FIG. 2A is a block diagram illustrating a horizontal transform stage in a folded 4-time transform architecture according to an embodiment of the present invention. In FIG. 2A, a transform circuit 202 receives row samples of a current TB containing residual and performs horizontal transform to generate horizontal transform coefficients. Since the current TB has 64*64 samples, a zero-out mechanism is applied to reduce the computational complexity, only the horizontal transform coefficients corresponding to a half of the current TB are stored in a coefficient buffer 204 while high frequency horizontal transform coefficients corresponding to the other half are zeroed out. The shaded region of the coefficient buffer 204 in FIG. 2A corresponds to the zero-out region of the current TB after horizontal transform. FIG. 2B is a block diagram illustrating a vertical transform stage in the folded 4-time transform architecture. The transform circuit 202 reads the horizontal transform coefficients from the coefficient buffer 204 in a transpose manner to obtain a transposed matrix of the horizontal transform coefficients and performs vertical transform to generate transform coefficients associated with the current TB. The output of the transform circuit 202 after the vertical transform stage is directly feed to a Quantization (RDOQ) module 206 for quantization. Quantized levels output from the quantization module 206 are recovered by an Inverse Quantization (IQ) module 208. The output of the inverse quantization module 208 is stored back to the coefficient buffer 204 as shown in FIG. 2B. FIG. 2C is a block diagram illustrating an inverse vertical transform stage in the folded 4-time transform architecture. The transform circuit 202 fetches transform coefficients from the coefficient buffer 204 in a transpose manner to obtain a transpose matrix of the transform coefficients to perform inverse vertical transform, then stores inverse vertical transform coefficients back to the coefficient buffer 204. FIG. 2D is a block diagram illustrating an inverse horizontal transform stage in the folded 4-time transform architecture. The transform circuit 202 fetches inverse vertical transform coefficients from the coefficient buffer 204 and performs inverse horizontal transform to generate reconstructed residual signal for the input TB. The reconstructed residual signal is stored in a reconstructed Static Random Access Memory (SRAM) 210 as shown in FIG. 2D.

Figure 3:
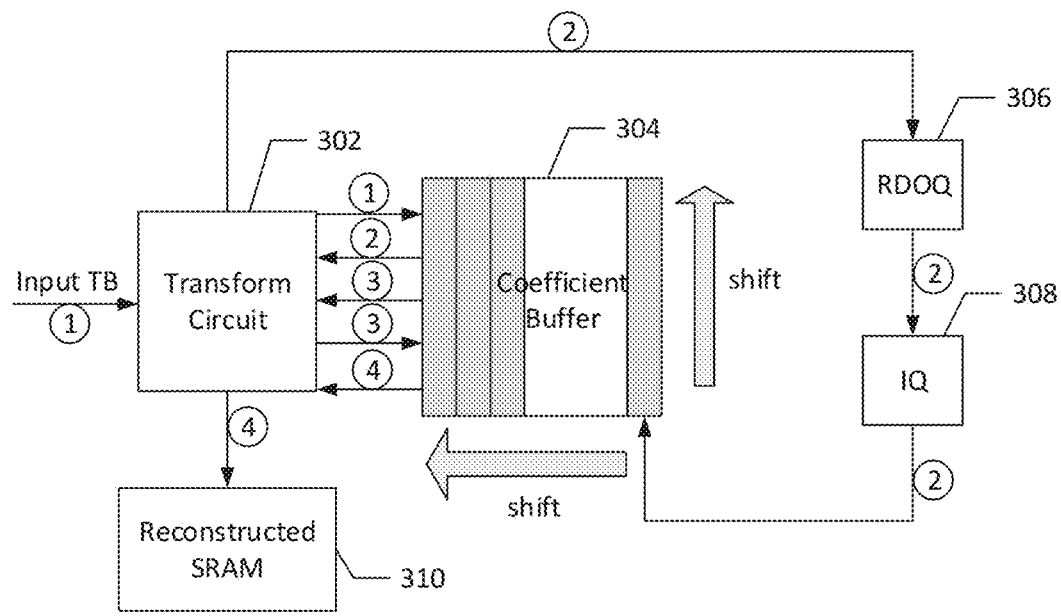
FIG. 3 illustrates the four transform stages by a shared transform circuit in a folded 4-time transform architecture according to an embodiment of the present invention.

The transform circuit 202 in FIGS. 2A to 2D is a shared transform module reused for the four transform stages. FIG. 3 illustrates the four transform stages performed by the shared transform circuit in the folded 4-time transform architecture according to this embodiment. The numbers on the arrows in FIG. 3 indicate the order of data flow corresponding to the four transform stages, where 1 is for horizontal transform, 2 is for vertical transform, 3 is for inverse vertical transform, and 4 is for inverse horizontal transform. The transform circuit 302 receives an input TB and performs horizontal transform. The result of horizontal transform is stored in the coefficient buffer 304, and read out to the transform circuit 302 in a transpose manner to perform vertical transform. The result of vertical transform is quantized by a Rate and Distortion Optimization Quantization (RDOQ) module 306, and quantized levels are inverse quantized by an Inverse Quantization (IQ) module 308. The result of inverse quantization is stored back to the coefficient buffer 304. The transform circuit 302 reads the result of inverse quantization from the coefficient buffer 304 in a transpose manner and performs inverse vertical transform. The result of inverse vertical transform is stored in the coefficient buffer 304. The transform circuit 302 reads out the result of the inverse vertical transform from the coefficient buffer 304 to perform inverse horizontal transform. The result of inverse horizontal transform is output to a reconstructed SRAM 310. In some embodiments, the buffer within the transform module is implemented by shift registers. The folded 4-time transform architecture uses a shift register cluster to serve as a transpose memory with a size of ½ *$TU_w$*$TU_n$*16 bits for processing a TU with a TU width or height equal to 64, or a size of $TU_w$*$TU_n$*16 bits for processing a TU with any other TU size. The shift register cluster shifts a row in the coefficient buffer 304 in each cycle for horizontal transform or inverse horizontal transform or shifts a column in the coefficient buffer 304 in each cycle for vertical transform or inverse vertical transform so the transform circuit 302 always processes the first row or column in the shift register cluster. The transpose memory refers to a memory allowing data stored therein to be read by rows or by columns. The number of multiplexers for signal controlling is reduced by utilizing the shift register cluster to serve as the transpose memory since the transform circuit 302 always processes the first row or column in the shift register cluster.

Embodiments of the folded 4-time transform architecture support DCT-II and different transform schemes in the MTS coding tool by a transform module with reconfigured design. For example, the transform module in the folded 4-time transform architecture includes a shared transform circuit 302 and coefficient buffer 304 as shown in FIG. 3. The transform module is reused for the four transform stages to save the hardware cost. Embodiments of the transform module not only process square transform blocks but also process rectangular transform blocks.

Hierarchical Design in Folded 4-time Transform Architecture In some embodiments of the present invention, there are multiple shared transform modules in the folded 4-time transform architecture, where each shared transform module is only used to process TBs with similar sizes. For example, a first shared transform module is employed to perform the four transform stages for TBs with sizes 64*64, 64*32, and 32*64, and a second shared transform module is employed to perform the four transform stages for TBs with sizes 32*32, 32*16, and 16*32, and a third shared transform module is employed to perform the four transform stages for TBs with sizes 16*16, 16*8, and 8*16, and so on. The hierarchical design for block size grouping is employed with a fixed throughput to achieve uniform hardware scheduling.

Figure 4:
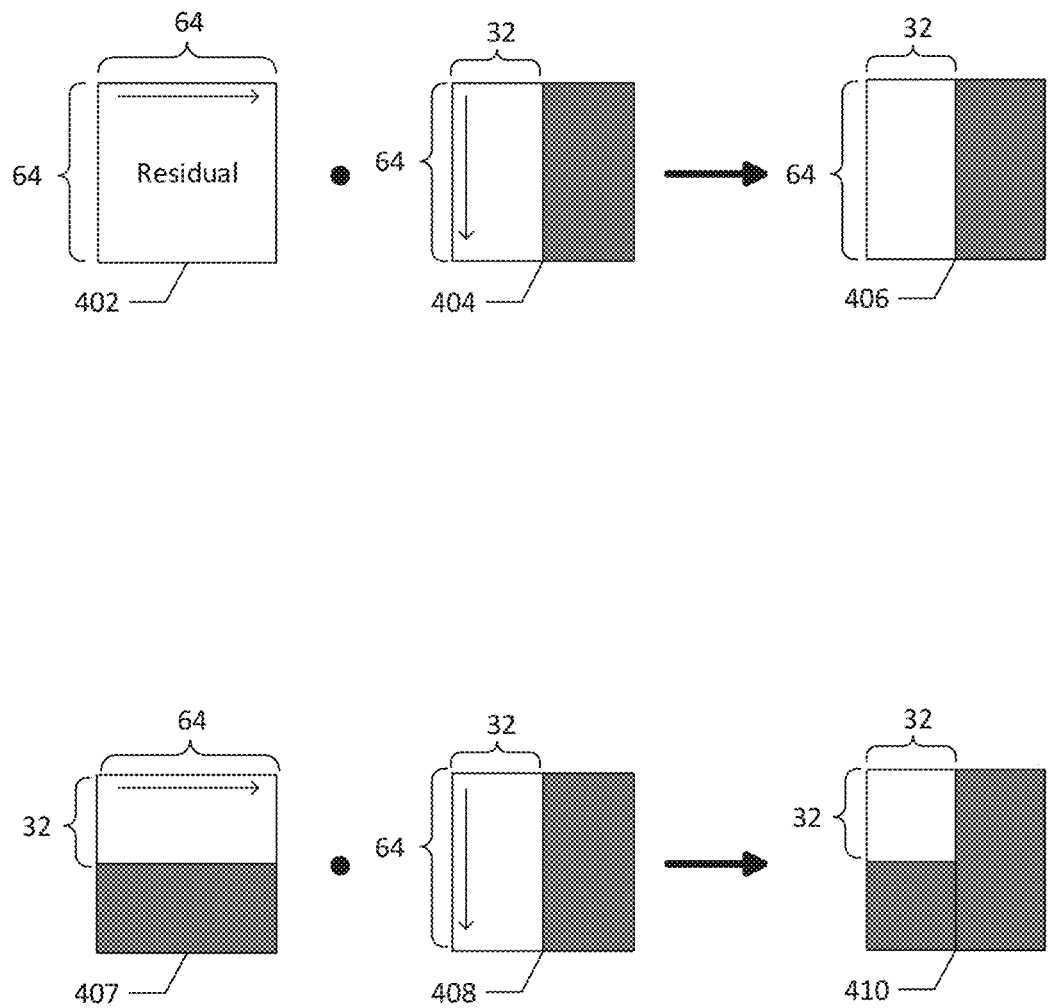
FIG. 4 illustrates an embodiment of applying a zero-out mechanism in horizontal transform and vertical transform for a 64*64 transform block.

Zero-out Mechanism for Large Transform Blocks Embodiments of the folded 4-time transform architecture support the zero-out mechanism adopted in the VVC standard to reduce the computation and buffer size to half for large transform blocks. For example, the zero-out mechanism is employed when a 64*64 transform block is transformed by DCT-II or when a 32*32 transform block is transformed by non-DCT-II such as DCT-VIII or DST-VII. FIG. 4 illustrates an embodiment of applying the zero-out mechanism during horizontal transform and vertical transform for a 64*64 transform block 402 containing residual. The 64*64 transform block is horizontal transformed by multiplying with a transform matrix 404, where the right half of the 64*64 transform matrix 404 is zeroed-out. Only the top 32*64 entries of the transform matrix 404 can have values not equal to zero. The horizontal transform output containing 32*64 valid coefficients is stored in a coefficient buffer 406 as the other 32*64 high frequency coefficients are zeroed-out after horizontal transform. The 32*64 coefficients stored in the coefficient buffer 406 are read by a transpose manner to obtain a 64*32 coefficients in a matrix 407, and the 64*32 coefficients are vertical transformed by multiplying with a transform matrix 408, where the right half of the 64*64 transform matrix 408 is zeroed-out. The vertical transform output containing only 32*32 coefficients is then stored in a coefficient buffer 410. The coefficient buffers 406 and 410 may be implemented by the same buffer in one embodiment. The coefficient buffer 406 used in the embodiments of the folded 4-time transform architecture is consisting of 32*64 16-bit registers, which is only half the size of the 64*64 16-bit registers needed in the conventional transform architecture. The number of Multiply Accumulate operations (MACs) needed in one shared transform circuit also reduces from 64*64 sets to 32*64 sets according to the embodiments of the present invention. Half of the MACs and buffers are saved in transform modules for large TBs according to the zero-out mechanism.

Figure 5A:
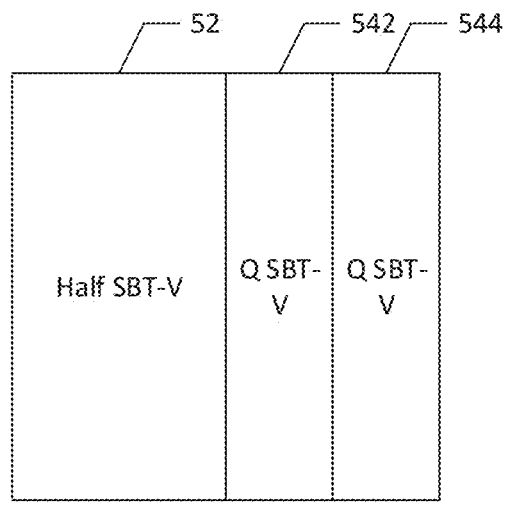
FIGS. 5A and 5B illustrate examples of processing two or three SBT modes in one transform iteration according to an embodiment of the present invention.
Figure 5B:
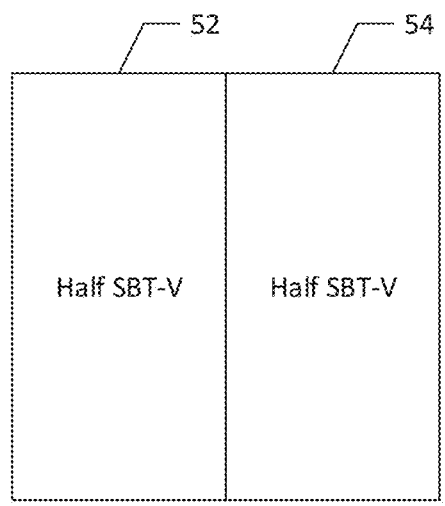

Processing Complementary Sub-Block Transform (SBT) Modes in One Transform Iteration In the VVC standard, eight SBT modes associated with different configurations of the size and location of transform subblock may be considered in the encoding process. After conducting the SBT mode decision process on a residual block, a transform subblock within the residual block according to the selected SBT mode is coded while residual in the remaining part of the residual block is zeroed-out. In order to reduce the transform iterations for the eight SBT modes, complementary SBT modes can be processed in one transform run according to an embodiment of the present invention. In this embodiment, there are some algorithm changes in the SBT mode decision process in the Low Complexity (LC) Rate and Distortion Optimization (RDO). In the LC RDO, a Sum of Squared Difference (SSD) for each SBT mode is calculated, and the SBT mode corresponding to the lowest cost is selected. The selected SBT mode and its complementary SBT mode(s) are processed in one High Complexity (HC) RDO transform run according to this embodiment. The SSD for each SBT mode is calculated in a similar manner as in the VTM fast algorithm. For each SBT mode, the SSD for the transform subblock S1 and the SSD for the zero-out subblock S2 are derived, and the cost for this SBT mode is then derived from the two SSDs S1 and S2. For example, the cost is equal to S1/32+S2. The costs for the SBT modes are compared and the SBT mode with the lowest cost is selected. In an example, the selected SBT mode corresponds to a transform subblock located in the left half of a residual block as shown in FIGS. 5A and. 5B. FIG. 5A and FIG. 5B illustrate two examples of processing complementary SBT modes in one transform iteration when the selected SBT mode corresponds to a transform subblock 52 which is half the residual block size and is in the left of the residual block. The transform subblock 52 associated with the selected SBT mode as shown in FIGS. 5A and 5B is split from the residual block by vertical partitioning. In FIG. 5A, the two complementary SBT modes of the selected SBT mode correspond to a transform subblock 542 and a transform subblock 544 each is a quarter of the residual block size. The selected SBT mode and its two complementary SBT modes as shown in FIG. 5A are tested together in one HC RDO transform run, and the best SBT mode out of these three SBT modes can be determined. In FIG. 5B, the complementary SBT mode of the selected SBT mode corresponds to a transform subblock 54 which is half the residual block size. In this example, the selected SBT mode and its complementary SBT mode as shown in FIG. 5B are tested together in one HC RDO transform run, and the best SBT mode out of these two SBT modes can be determined.

Figure 6:
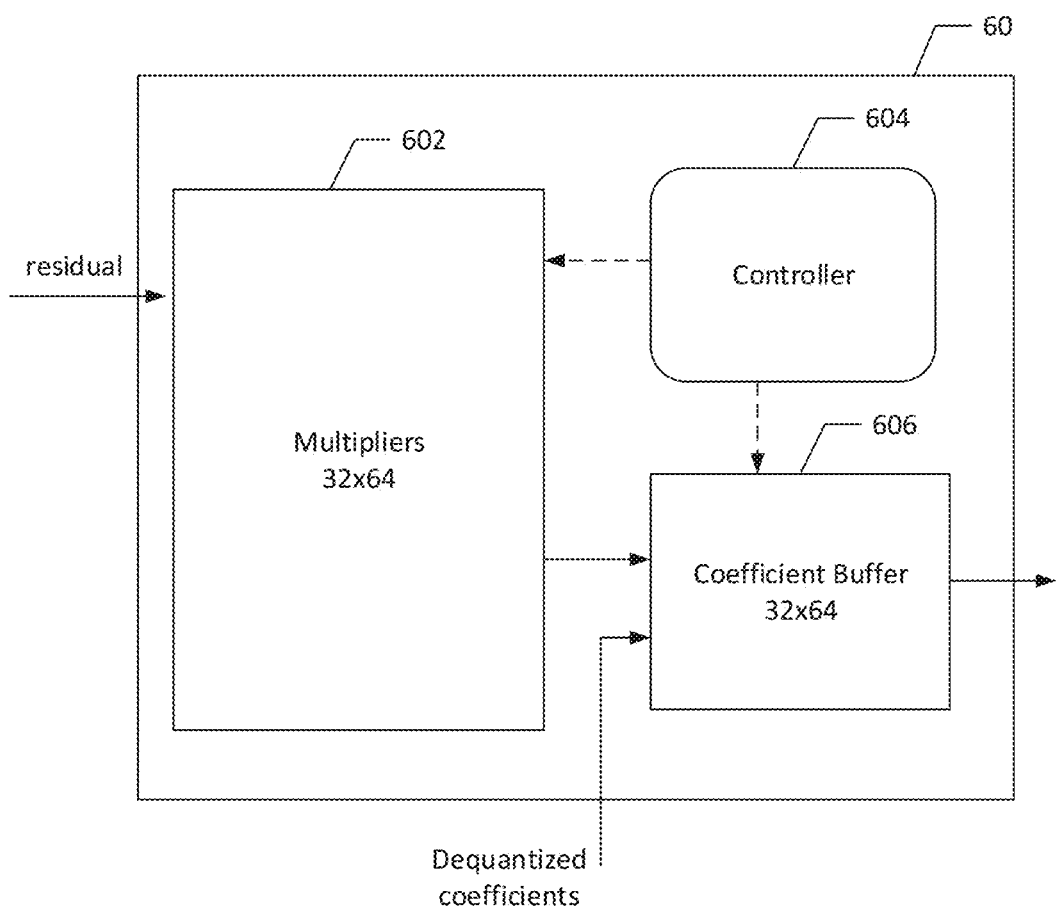
FIG. 6 illustrates a block diagram of a transform module in the folded 4-time transform architecture according to an embodiment of the present invention.

Exemplary Block Diagram of Transform Module in Folded 4-time Transform Architecture FIG. 6 illustrates a block diagram of a transform module in the folded 4-time transform architecture according to an embodiment of the present invention. The transform module 60 is composed of 32*64 sets of multipliers 602, a controller 604, and a 32*64 coefficient buffer 606. For the horizontal transform stage, the controller 604 controls the coefficient buffer 606 to shift a row in each cycle and the controller 604 controls the multipliers 602 to multiply the input residual signal with matrix coefficients of a horizontal transform matrix by always multiplying the first row in the registers with the corresponding matrix coefficients to generate horizontal transform coefficients. The controller 604 then controls the transform module 60 to store the horizontal transform coefficients in the coefficient buffer 606. For the vertical transform stage, the controller 604 in this embodiment controls the coefficient buffer to output a transpose matrix of the horizontal transform coefficients and the controller 604 controls the multipliers 602 to multiply the transpose matrix with matrix coefficients of a vertical transform matrix. The transpose matrix of the horizontal transform coefficients is output from the coefficient buffer 606 by controlling the coefficient buffer 606 to shift a column instead of a row in each cycle so the multipliers 602 can always multiply the first column in the registers with the matrix coefficients. The result of the vertical transform stage is output by the transform module 60. After quantization and inverse quantization of transformed coefficients, dequantized coefficients are received by the transform module 60 and stored in the coefficient buffer 606. In the inverse vertical transform stage, the controller 604 reads out the dequantized coefficients from the coefficient buffer 606 in a transpose manner by controlling the coefficient buffer 606 to shift a column in each cycle so the transform module always processes the first column in the registers. The controller 604 then controls the multipliers 602 to multiply the transpose matrix of the dequantized coefficients with matrix coefficients of an inverse vertical transform matrix to perform inverse vertical transform. The result of the inverse transform stage is stored in the coefficient buffer 606. In the inverse horizontal transform stage, the controller 604 reads out the result of the inverse transform stage from the coefficient buffer 606 by controlling the coefficient buffer 606 to shift a row in each cycle so the first row is always used to perform inverse horizontal transform by the multipliers 602. The result of the inverse horizontal transform stage is a reconstructed residual signal.

Figure 7:
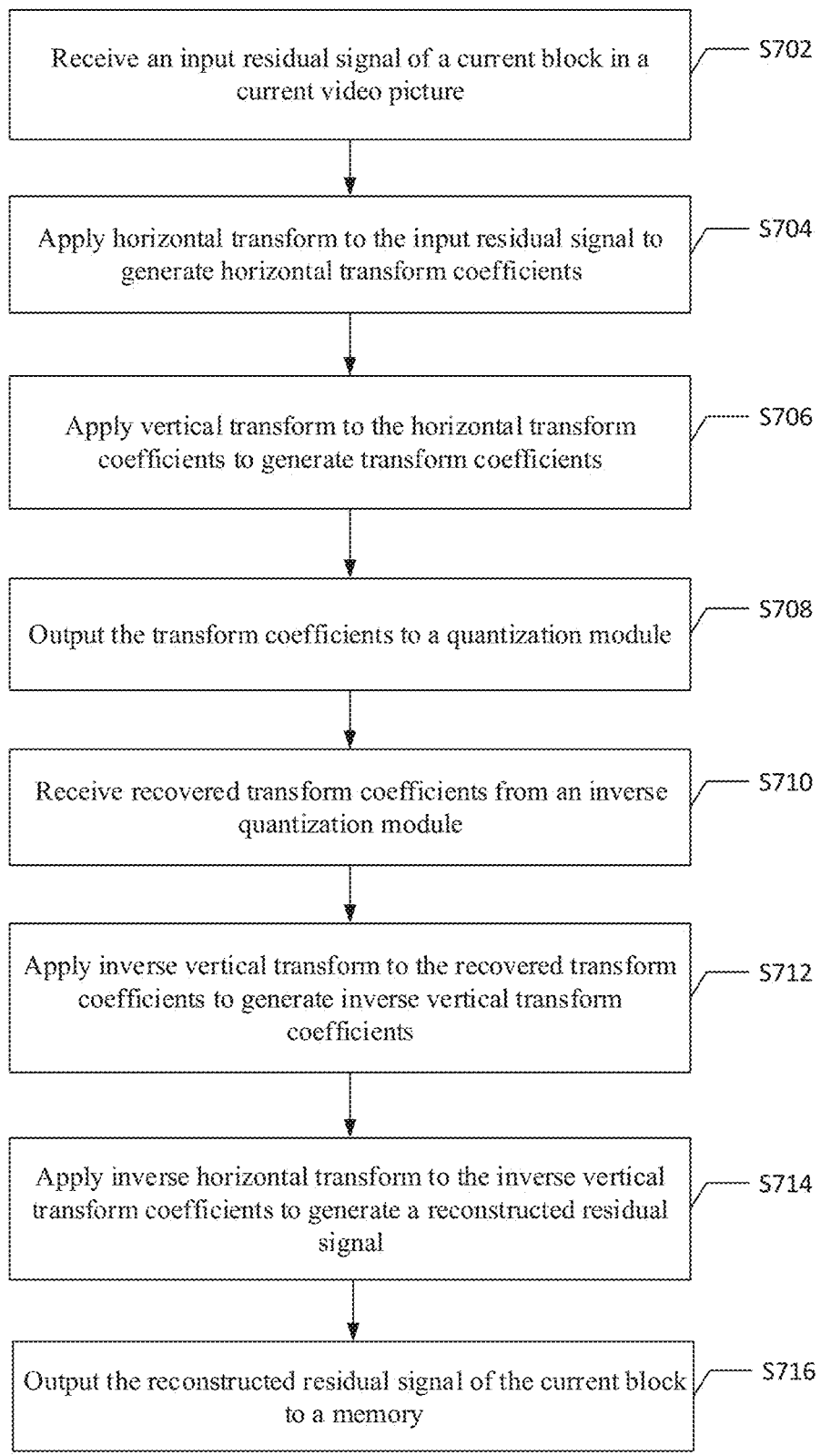
FIG. 7 is a flowchart illustrating an embodiment of the shared transform circuit performing the four transform stages.

Representative Flowchart of Shared Transform Circuit in Folded 4-time Transform Architecture FIG. 7 is a flowchart illustrating an exemplary embodiment of a shared transform circuit performing the four transform stages in a video encoding system. In step S702, the shared transform circuit receives an input residual signal of a current block in a current video picture. For example, the current block is a transform block. The shared transform circuit applies horizontal transform to the input residual signal to generate horizontal transform coefficients in step S704 and applies vertical transform to the horizontal transform coefficients to generate transform coefficients in step S706. In step S708, the shared transform circuit outputs the transform coefficients to a quantized module. In step S710, the shared transform circuit receives recovered transform coefficients from an inverse quantization module. The shared transform circuit applies inverse vertical transform to the recovered transform coefficients to generate inverse vertical transform coefficients in step S712 and applies inverse horizontal transform to the inverse vertical transform coefficients to generate a reconstructed residual signal in step S714. The shared transform circuit then outputs the reconstructed residual signal of the current block to a memory in step S716.

Figure 8:
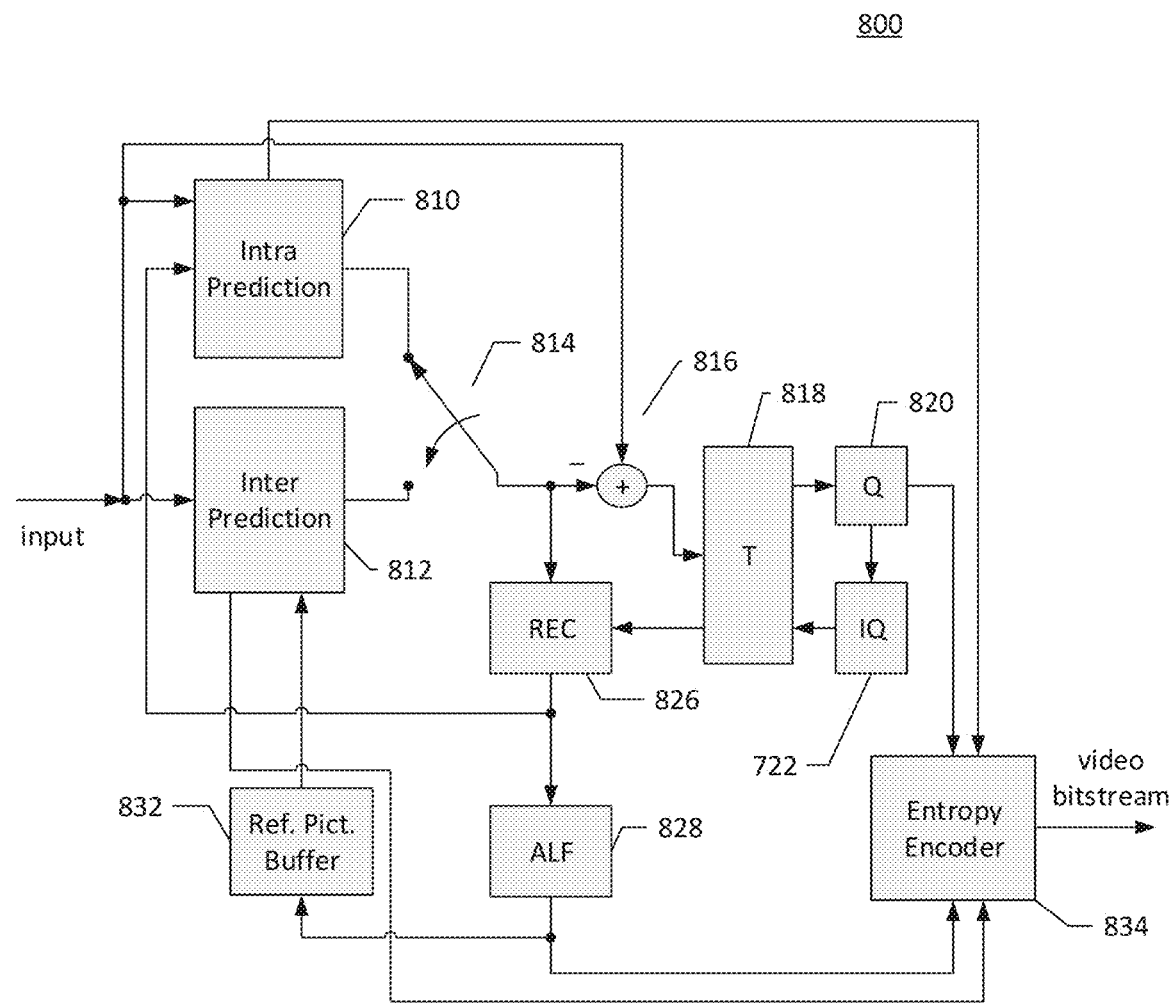
FIG. 8 illustrates an exemplary system block diagram for a video encoding system incorporating the video encoding method according to one or more embodiments of the present invention.

Representative System Block Diagrams FIG. 8 illustrates an exemplary system block diagram for a Video Encoder 800 implementing one or more embodiments of the folded 4-time transform architecture. An Intra Predication prediction module 810 provides intra predictors based on reconstructed video data of a current picture. An Inter prediction module 812 performs Motion Estimation (ME) and Motion Compensation (MC) to provide predictors based on referencing video data from other picture or pictures. Either the Intra Prediction module 810 or Inter Prediction module 812 supplies the selected predictor to an Adder 816 to form a residual signal. The residual signal is processed by a Transform module (T) 818 to generate transform coefficients. The transform module 818 first applies horizontal transform followed by vertical transform to generate the transform coefficients. The transform module 818 includes a shared transform circuit and a coefficient buffer according to some embodiments of the present invention. The coefficient buffer adopts a shift register cluster as a transpose memory to reduce a number of multiplexers for signal controlling according to some embodiments. In one embodiment of the present invention, the transform module 818 is used for processing blocks with one or more predetermined sizes, and one or more other transform modules are used for processing blocks with other sizes. For example, the transform module 818 is designed for processing 64*64, 64*32, and 32*64 transform blocks in a fixed throughput to achieve uniform hardware scheduling. The transform coefficients are processed by a Quantization module (Q) 820 followed by an Inverse Quantization module (IQ) 822. The output of the IQ module 822 is processed by the transform module 818 to generate a reconstructed residual signal. The transform module 818 applies inverse vertical transform followed by inverse horizontal transform to generate the reconstructed residual signal. The transform module 818 supports DCT-II transform and other transform schemes adopted in the MTS coding tool according to an embodiment of the present invention. In some embodiments, the transform module 818 supports the zero-out mechanism when processing large transform blocks.

A transformed and quantized residual signal output from the quantization module is encoded by an Entropy Encoder 830 to form a video bitstream. The video bitstream is then packed with side information. As shown in FIG. 8, the reconstructed residual signal is added back to the selected predictor at a Reconstruction module (REC) 826 to produce a reconstructed video data. The reconstructed video data may be stored in a Reference Picture Buffer (Ref. Pict.

Buffer) 832 and used for prediction of other pictures. The reconstructed video data from the REC module 826 may be subject to various impairments due to the encoding processing, consequently, in-loop filtering such as an Adaptive Loop Filter (ALF) 828 is applied to the reconstructed video data before storing in the Reference Picture Buffer 832 to further enhance picture quality. Syntax elements are provided to the Entropy Encoder 830 for incorporation into the video bitstream.

Various components of the Video Encoder 800 in FIG. 8 may be implemented by hardware components, one or more processors configured to execute program instructions stored in a memory, or a combination of hardware and processor. For example, a processor executes program instructions to preform horizontal transform on the residual signal. The processor is equipped with a single or multiple processing cores. In some examples, the processor executes program instructions to perform functions in some components in the Encoder 800, and the memory electrically coupled with the processor is used to store the program instructions, information corresponding to the reconstructed images of blocks, and/or intermediate data during the encoding process. The memory in some embodiment includes a non-transitory computer readable medium, such as a semiconductor or solid-state memory, a Random Access Memory (RAM), a Read-Only Memory (ROM), a hard disk, an optical disk, or other suitable storage medium. The memory may also be a combination of two or more of the non-transitory computer readable medium listed above.

Embodiments of the video data processing method performing a specific process in a video encoding system may be implemented in a circuit integrated into a video compression chip or program code integrated into video compression software to perform the processing described above. For examples, applying transform on the residual signal may be realized in program code to be executed on a computer processor, a Digital Signal Processor (DSP), a microprocessor, or field programmable gate array (FPGA). These processors can be configured to perform specific tasks according to the invention, by executing machine-readable software code or firmware code that defines the methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of encoding video data in a video coding system, comprising:
   receiving an input residual signal associated with a current block in a current video picture by a shared transform circuit;
   applying horizontal transform to the input residual signal by the shared transform circuit to generate horizontal transform coefficients;
   applying vertical transform to the horizontal transform coefficients by the shared transform circuit to generate transform coefficients for the current block;
   applying quantization to the transform coefficients to generate quantized levels then applying inverse quantization to generate recovered transform coefficients;
   applying inverse vertical transform to the recovered transform coefficients by the shared transform circuit to generate inverse vertical transform coefficients;
   applying inverse horizontal transform to the inverse vertical transform coefficients by the shared transform circuit to generate a reconstructed residual signal for the current block; and
   encoding the current block based on to the quantized levels of the current block;
   wherein the shared transform circuit is configured to process a plurality of complementary Sub-Block Transform (SBT) modes in one transform run.

2. The method of claim 1, wherein a coefficient buffer is used to store intermediate transform coefficients, the method further comprising:
   storing the horizontal transform coefficients in the coefficient buffer, and reading the horizontal transform coefficients from the coefficient buffer by the shared transform circuit for vertical transform;
   storing the recovered transform coefficients in the coefficient buffer, and reading the recovered transform coefficients from the coefficient buffer by the shared transform circuit for inverse vertical transform; and
   storing the inverse vertical transform coefficients in the coefficient buffer, and reading the inverse vertical transform coefficients from the coefficient buffer by the shared transform circuit for inverse horizontal transform.

3. The method of claim 2, wherein the shared transform circuit comprises a controller reading the horizontal transform coefficients from the coefficient buffer in a transpose manner to obtain a transposed matrix for vertical transform, and the controller reads the recovered transform coefficients from the coefficient buffer in the transpose manner to obtain another transposed matrix for inverse vertical transform.

4. The method of claim 3, wherein the coefficient buffer comprises a shift register cluster shifting a row in the coefficient buffer in each cycle for horizontal transform or inverse horizontal transform or shifting a column in the coefficient buffer in each cycle for vertical transform or inverse vertical transform.

5. The method of claim 4, wherein a number of 16-bit registers in the shift register cluster is equal to half of a block width multiplied by a block height when any of the block width and block height of the current block is equal to 64 samples, and a number of 16-bit registers in the shift register cluster is equal to a block width multiplied by a block height when both the block width and block height of the current block are less than 64 samples.

6. The method of claim 2, wherein the current block is a 64*64 transform block, the coefficient buffer is consisting of 32*64 16-bit registers and 32*64 sets of Multiplier Accumulate operations (MACs) are needed in the shared transform circuit.

7. The method of claim 1, wherein a zero-out mechanism is applied to reduce a computation complexity of the shared transform circuit when the current block is a 64*64 transform block for DCT-II transform or when the current block is a 32*32 transform block for DST-VII transform or DCT-VIII transform, wherein the zero-out mechanism forces half of the horizontal transform coefficients to be zero after horizontal transform and another quarter of the transform coefficients to be zero after vertical transform.

8. The method of claim 1, wherein the shared transform circuit supports a plurality of transform schemes comprising DCT-II transform, DST-VII transform, and DCT-VIII transform.

9. The method of claim 1, further comprising storing the reconstructed residual signal in a memory.

10. The method of claim 1, wherein the shared transform circuit is used to process blocks with one or more predetermined sizes, and the video coding system comprises a second shared transform circuit for processing blocks with sizes other than the one or more predetermined sizes.

11. The method of claim 10, wherein the shared transform circuit is used to process blocks with sizes 64*64, 64*32, and 32*64, and the second shared transform circuit is used to process blocks with sizes 32*32, 32*16, and 16*32.

12. The method of claim 1, wherein the shared transform circuit is used to process blocks with a first set of predetermined sizes, and the video coding system comprises a second shared transform circuit for processing blocks with a second set of predetermined sizes, wherein the second set of predetermined sizes is different from the first set of predetermined sizes.

13. The method of claim 12, wherein the predetermined sizes in the first set are similar to each other, and the predetermined sizes in the second set are similar to each other.

14. An apparatus for performing video encoding, comprising: a computer processor configured for receiving video data; and programming executable on the computer processor for video encoding by performing steps comprising:

receiving an input residual signal associated with a current block in a current video picture by a shared transform circuit;

applying horizontal transform to the input residual signal by the shared transform circuit to generate horizontal transform coefficients;

applying vertical transform to the horizontal transform coefficients by the shared transform circuit to generate transform coefficients for the current block;

applying quantization to the transform coefficients to generate quantized levels then applying inverse quantization to generate recovered transform coefficients;

applying inverse vertical transform to the recovered transform coefficients by the shared transform circuit to generate inverse vertical transform coefficients;

applying inverse horizontal transform to the inverse vertical transform coefficients by the shared transform circuit to generate a reconstructed residual signal for the current block; and encoding the current block based on to the quantized levels of the current block;

wherein the shared transform circuit is configured to process a plurality of complementary Sub-Block Transform (SBT) modes in one transform run.

* * * * *